US010525869B2

(12) United States Patent
Paulekuhn et al.

(10) Patent No.: US 10,525,869 B2
(45) Date of Patent: Jan. 7, 2020

(54) LOCKING DEVICE FOR CONTAINERS (71) Applicant: JOST-WERKE GMBH, Neu-Isenburg (DE)

(72) Inventors: Hans-Peter Paulekuhn, Bad Arolsen (DE); José Manuel Algüera, Aschaffenburg (DE); Stephan Albers, Pr. Oldendorf (DE)

(73) Assignee: JOST-WERKE GMBH, Neu-Isenburg (DE)

(*) Notice: Subject to any disclaimer, the term of this patent is extended or adjusted under 35 U.S.C. 154(b) by 0 days.

(21) Appl. No.: 15/500,146

(22) PCT Filed: Sep. 18, 2015

(86) PCT No.: PCT/EP2015/071513
§ 371 (c)(1),
(2) Date: Jan. 30, 2017

(87) PCT Pub. No.: WO2016/042155
PCT Pub. Date: Mar. 24, 2016

(65) Prior Publication Data
US 2017/0267160 A1  Sep. 21, 2017

(30) Foreign Application Priority Data
Sep. 19, 2014  (DE) .................. 10 2014 218 891

(51) Int. Cl.
B60P 7/08  (2006.01)
B60P 7/13  (2006.01)
(Continued)

(52) U.S. Cl.
CPC ................. *B60P 7/13* (2013.01); *B60P 7/132* (2013.01); *B61D 3/16* (2013.01); *B61D 3/20* (2013.01);
(Continued)

(58) Field of Classification Search
CPC . B60P 7/13; B60P 7/132; B65D 88/12; B65D 88/121; B65D 88/02;
(Continued)

(56) References Cited

U.S. PATENT DOCUMENTS 2,424,429 A * 7/1947 Bamberg .................. B60P 7/13
410/69
3,431,017 A   3/1969 Joseph
(Continued)

FOREIGN PATENT DOCUMENTS

CN   201457214 U   5/2010
CN   102933424 A   2/2013
(Continued)

OTHER PUBLICATIONS

Chinese Office Action of family member application dated Jun. 28, 2018.
(Continued)

Primary Examiner — Stephen T Gordon
(74) Attorney, Agent, or Firm — Hudak, Shunk & Farine Co. LPA (57) ABSTRACT A locking device for containers on a vehicle chassis, having a housing, a plug-in pin which is mounted displaceably in the housing and/or a rotary pin which is mounted rotatably in the housing, wherein the plug-in pin and/or the rotary pin can be moved between an open position and a locked position. The invention was based on the problem of providing a locking device for containers which is triggered automatically by way of the loading operation. According to the invention, the problem is solved by the fact that a spring element which interacts with a triggering element acts on the plug-in pin or the rotary pin, wherein the triggering unit has at least one sensing bolt which protrudes out of the housing in the direction of a container fitting in the open position.

25 Claims, 6 Drawing Sheets (51) Int. Cl.
*B61D 45/00* (2006.01)
*B61D 3/16* (2006.01)
*B61D 3/20* (2006.01)
*B65D 90/00* (2006.01)
*B65D 88/02* (2006.01)
*B65D 88/12* (2006.01)

(52) U.S. Cl.
CPC .......... *B61D 45/00* (2013.01); *B61D 45/001* (2013.01); *B61D 45/007* (2013.01); *B65D 88/02* (2013.01); *B65D 88/12* (2013.01); *B65D 88/121* (2013.01); *B65D 90/0006* (2013.01); *B65D 90/0013* (2013.01); *B65D 90/0026* (2013.01)

(58) Field of Classification Search
CPC .......... B65D 90/0006; B65D 90/0026; B65D 90/0013; B61D 3/16; B61D 3/20; B61D 45/00; B61D 45/001; B61D 45/007
USPC .............. 410/69, 70, 73, 76, 82, 83; 24/287; 248/500, 503; 280/406.1
See application file for complete search history.

(56) References Cited

U.S. PATENT DOCUMENTS

| | | |
|---|---|---|
| 3,691,595 A | 9/1972 | Backteman et al. |
| 5,575,599 A | 11/1996 | Conlee et al. |
| 5,839,864 A * | 11/1998 | Reynard .................. B60P 7/13 |
| | | 410/69 |

FOREIGN PATENT DOCUMENTS

| | | |
|---|---|---|
| CN | 103568926 A | 2/2014 |
| DE | 2110716 | 10/1971 |
| DE | 91 14 903.7 U1 | 5/1993 |
| DE | 197 20 238 A1 | 11/1998 |
| DE | 10 2007 007 067 A1 | 8/2008 |
| DE | 20 2010 008 181 U1 | 11/2010 |
| DE | 20 2010 005 717 U1 | 11/2011 |
| EP | 0 934 848 A2 | 8/1999 |
| EP | 1 900 571 A2 | 3/2008 |
| EP | 2 689 964 A2 | 1/2014 |
| JP | 4750924 A | 12/1972 |
| JP | 10226270 | 8/1998 |

OTHER PUBLICATIONS

First Office Action dated Dec. 4, 2018 for corresponding Japanese application.
German Office Action dated Apr. 12, 2019.
Translation of Japanese first office action dated Oct. 1, 2019 for corresponding JP application 2017-511822.

* cited by examiner

LOCKING DEVICE FOR CONTAINERS

FIELD OF THE INVENTION

The invention concerns a locking device for container on a vehicle chassis, comprising a housing, a plug-in pin which is mounted displaceably in the housing and/or a rotary pin which is mounted rotatably in the housing, wherein the plug-in pin and/or the rotary pin can be moved between an open position and a locked position.

BACKGROUND OF THE INVENTION

Vehicle chassis to accommodate 40-foot and 20-foot long containers are often designed as a so-called gooseneck chassis and have a lower placed rear section and a higher placed front section. The longer 40-foot containers have a gooseneck tunnel, into which the higher placed front section of the chassis extends. If, instead of a 40-foot container, two 20-foot containers are to be transported, which are normally designed without a gooseneck tunnel, these stand with a height discrepancy relative to each other at the front and rear section of the chassis.

In order to handle containers with and without gooseneck tunnel, locking devices known from German utility model G 91 14 903.7 are arranged on either side at the front end of the front section. These have a plug-in pin which is displaceable in the horizontal plane for the securing of a container with gooseneck tunnel as well as a rotary pin which is rotatable about a vertical axis for the securing of a container of different design.

A generic prior art is disclosed by DE 197 20 238 A1 with a container locking device for the front end of the front section of a gooseneck chassis. The known container lock comprises a housing, in which a plug-in pin is mounted displaceably and a rotary pin rotatably, the plug-in pin and the rotary pin being geared together such that, when the rotary pin is activated, the plug-in pin is also displaced and/or when the plug-in pin is activated the rotary pin is also rotated. This is supposed to provide increased comfort and safety, since only one activating element is present, which acts at the same time on both locking elements and thereby minimizes the risk of operator error. However, it has proven to be a drawback that one person must still be present in the area of the container locking devices during the loading process and must operate the respective activating element.

SUMMARY OF THE INVENTION

Accordingly, the problem on which the invention was based was the providing of a locking device for container which is triggered automatically by way of the loading operation.

The problem is solved according to the invention with a locking device for a container on a vehicle chassis having a housing, a plug-in pin which is mounted displaceably in the housing and/or a rotary pin which is mounted rotatably in the housing, wherein the plug-in pin and/or the rotary pin can be moved between an open position and a locked position, wherein a spring element which interacts with a triggering element acts on the plug-in pin or the rotary pin, wherein the triggering element has at least one sensing bolt which protrudes out of the housing in the direction of a container fitting in the open position. The activating of the locking device for containers thus occurs semi-automatically by an approaching of the container fitting and a shoving in or the at least one sensing bolt. The properly loaded container presses the sensing bolt into the housing, so that thanks to the pretensioning of the spring element either the plug-in pin is pushes laterally out from the housing and/or the rotary pin projecting at the top from the housing is rotated about its lengthwise axis.

By a rotary pin is meant a bolt with a locking head formed at its upper end. The locking head engages from below with a container fitting and secures the container by a 90° rotation. The rotary pin is a single-piece, integral component with no further moving parts and it performs exclusively a rotational movement in its circumferential direction. Preferably, the rotary pin extends entirely through the housing and projects from it at both opposite sides.

The plug-in pin serves to secure a container with gooseneck tunnel on a gooseneck chassis on a container fitting provided for this purpose at the container end face. After the lowering of the container to nearly the same level as that of the vehicle chassis, the container is moved in the driving direction of the vehicle until it makes contact with the housing of the locking devices for containers and only then is it fully lowered, so that the plug-in pin can be shoved from the side into the container fitting. In this way, the container is secured against vertical movements. The plug-in pin performs a linear movement.

Preferably, the housing comprises six side walls and is secured stationary on the vehicle chassis. The housing serves to protect the moving parts of the locking device from dirt and damage, especially the triggering element, and also for stowing of the rotary pin and plug-in pin.

However, it is especially preferably to provide a plug-in pin and a rotary pin and to couple them kinematically. This can be done, for example, by an intermeshing toothing formed on each of the plug-in pin and the rotary pin.

Thanks to this forced coupling of plug-in and rotary pin, it is enough to provide a single spring element, which only needs to be secured to one of the pins or in another suitable place in order to drive the pin. The other pin will be moved along without a spring element engaging it, yet does not enter into operative engagement with a container fitting, depending on the type of container used.

Advisedly, the at least one sensing bolt is mounted movably with respect to the housing. According to an especially advantageous embodiment, the at least one sensing bolt is guided to move in its axial direction with respect to the housing. In this way, a straight-line movement component of the approaching container fitting is transmitted to the housing and utilized to trigger the spring element.

Preferably, the at least one sensing bolt is a vertical sensing bolt, which is arranged axially parallel to the rotary pin. The vertical sensing bolt can also be slanting with respect to the rotary pin, so that a jam-free pushing is possible. The rotary pin interacts solely with a container fitting approaching from above, whose movement direction is utilized by the vertical sensing bolt to trigger the spring element and swivel the rotary pin about its vertical axis from the open position to the locked position.

Alternatively to the substantially axially parallel and longitudinally displaceable orientation of the vertical sensing bolt to the rotary pin, the latter can also be mounted rotatably about a first swivel axis. When this vertical sensing bolt is placed under load by the container fitting, the vertical sensing bolt swivels along a circular trajectory about its swivel axis.

Preferably, the first swivel axis is oriented at right angles to an axial extension of the rotary pin, without having to converge on it. Thus, the first swivel axis lies in a horizontal plane.

Advantageously, the vertical sensing bolt and the rotary pin extend through a common top wall of the housing. This is necessary in order for the rotary pin to engage with the container fitting from underneath. The vertical sensing bolt in the open position stands in front of the top wall and is pressed inward by the container fitting until at most it is flush with the top wall.

Advantageously, the vertical sensing bolt is arranged at a distance sideways from the rotary pin. The container fitting lowered from above onto the housing comprises an opening on its bottom side, into which the rotary pin protrudes. The container fitting is prevented from lifting off from the locking head by a rotary movement. However, the vertical sensing bolt is activated by the bottom side of the container fitting, and is arranged at an offset so that even when the container is set down imprecisely it always makes contact with the bottom side of the container fitting and is not situated beneath the opening to receive the rotary pin.

Alternatively or additionally to the vertical sensing bolt, the at least one sensing bolt can also be a horizontal sensing bolt, which is oriented axially parallel or at a slant, enabling a jam-free pushing, to the plug-in pin. The axial parallel orientation pertains to the section of the plug-in pin protruding from the housing, which is pushed into an opening made at the side of the container fitting. The horizontal approaching of the container fitting is identified by the horizontal sensing bolt, which is likewise displaceable in the horizontal direction.

Optionally to the substantially axially parallel and longitudinally displaceable orientation of the horizontal sensing bolt to the plug-in pin, the latter can also be mounted rotatably about a second swivel axis. When this horizontal sensing bolt is placed under load by a container fitting approaching from the side, the horizontal sensing bolt swivels along a circular trajectory about its swivel axis.

Preferably, the second swivel axis is oriented at right angles to an axial extension of the plug-in pin, without having to converge on it. Thus, the second swivel axis lies in a vertical plane.

It has proven to be especially advantageous for the horizontal sensing bolt and the plug-in pin to extend through a common end wall of the housing. The end wall of the housing serves as an end stop for the horizontally approaching container fitting, so that this enables an early triggering of the plug-in pin when the horizontal sensing bolt is arranged in the end wall.

Preferably, the horizontal sensing bolt is arranged at a distance sideways from the plug-in pin. thus should also lessen the risk of a failed triggering of the plug-in pin, which might result from the horizontal sensing bolt being too close to the plug-in pin and not abutting against the side surface of the container fitting, but instead protruding into the opening of the container fitting designed to receive the plug-in pin. By a sideways distant arrangement is meant a position set off in lateral view above, below, in front of or behind the plug-in pin.

Advantageously, the triggering element comprises a catching hook, against which the vertical sensing bolt and/or horizontal sensing bolt pushes by its side away from the container fitting inside the housing. This produces an immediate transmission of force from the vertical sensing bolt or the horizontal sensing bolt to the catching hook. The catching hook has a region with a preferably curved or angular shape, against which the rotary pin or plug-in pin can catch. The catching hook is mounted relative to the housing so that the latter is tilted by a pushing motion transmitted by the vertical sensing bolt or horizontal sensing bolt and releases the vertical sensing bolt or horizontal sensing bolt which is pretensioned by the spring element.

Especially preferred is an embodiment in which the rotary pin or the plug-in pin is held in the open position by the catching hook. To reach the locked position, the form-fitting connection between catching hook and rotary pin or plug-in pin is released and the respective pin or both pins are moved into the locked position by the pretensioning of the spring element.

It is possible to form a catching element on the rotary pin or the plug-in pin, which engages behind the catching hook in the open position. For this, the catching element preferably comprises at least one wall section oriented substantially perpendicular to the movement direction of the rotary pin or plug-in pin.

Advantageously, the catching element is fashioned with a rounded or inclined striking surface on its side facing the catching hook in the locked position, against which the catching hook pushes during the return swiveling of the rotary pin from the locked position to the open position and slides along this until reaching the open position. In the open position, the catching hook drops into its form-fitting retaining position and engages with the catching element from above, for example. In particular, the curved or angular region of the catching hook makes contact with the wall section of the catching element which is oriented perpendicular to the movement direction.

Preferably, upon pushing of the vertical sensing bolt or the horizontal sensing bolt into the housing by the container fitting the catching hook is released from the operative engagement with the catching element and the spring element moves the plug-in pin and/or the rotary pin into the locked position. This occurs automatically, that is, with no human involvement.

Advantageously, the rotary pin is engaged, free of twisting, by an activating lever, with which the rotary pin can be brought out of the locked position into the open position and thus the spring element can be placed in a pretensioned position. Preferably, the activating lever is located in the radial direction in front of a section of the rotary pin situated outside the housing. After an automatic reaching of the locking position, the open position of the rotary pin is reached by manual activation of the activating lever by an attending person.

Advantageously, the spring element is a torsion spring, which is held at its first end fixed to the housing and at its second end connected to the rotary pin. For example, the torsion spring can be designed as a helical spring or spiral spring and it should provide a sufficient return torque when the rotary pin is turned by around 90°.

The torsion spring can be arranged coaxially about a section of the rotary pin. The lower section of the rotary pin, protruding from the housing, is especially suitable for this.

Advantageously, the torsion spring is arranged at least partly outside the housing. Most particularly advantageous is an embodiment in which the torsion spring is arranged entirely outside the housing. This design ensures especially compact dimensions of the housing.

Alternatively to the embodiment of the invention with a torsion spring, the spring element can also be a compression spring, engaging by its first end with the plug-in pin and being braced immovably by its second end against the housing. This embodiment requires a somewhat larger housing, in which the compression spring is accommodated, for example in the form of a helical spring. The compression spring ensures a pushing of the plug-in pin forward and also a rotating of the rotary pin, when a rotary pin coupled forcibly to it is present, from the open position to the locked position.

Preferably the first end engages on a segment of the plug-in pin located permanently inside the housing. In this region, the plug-in pin is braced sufficiently in the radial direction and the compression spring does not need to withstand any laterally acting forces.

Advisedly, the compression spring is arranged entirely inside the housing, which lessens the exposure to dirt and grime and increases the operating availability of the locking device for containers.

Advantageously the plug-in pin passes through the housing in its open position and extends from the end wall opposite the container fitting. In its locking position, the plug-in pin can be flush with the end wall opposite the container fitting, set back from it, or protrude from it less than in the open position. Thanks to this design, the plug-in bolt can be used as an indicator of the open and/or closed state.

BRIEF DESCRIPTION OF THE DRAWINGS

For a better understanding, the invention shall now be explained more closely with the aid of 11 figures. There are shown.

DETAILED DESCRIPTION OF THE INVENTION

Figure 1:
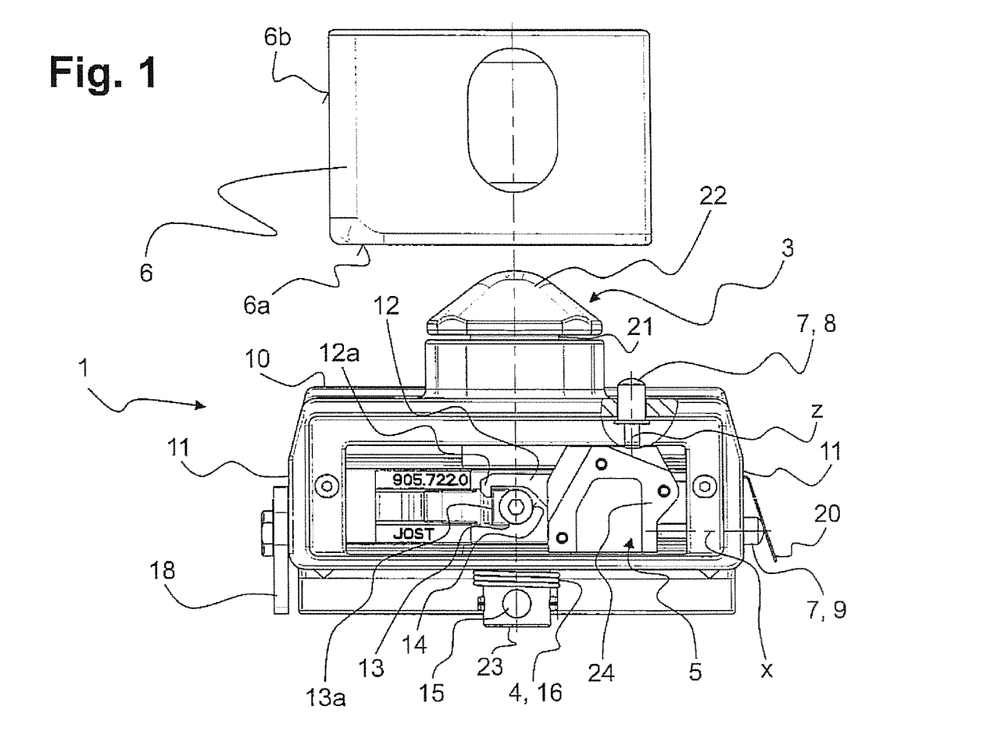
FIG. 1: a side view of a first embodiment of the invention for container loading from above in the open position of rotary and plug-in pin.
Figure 2:
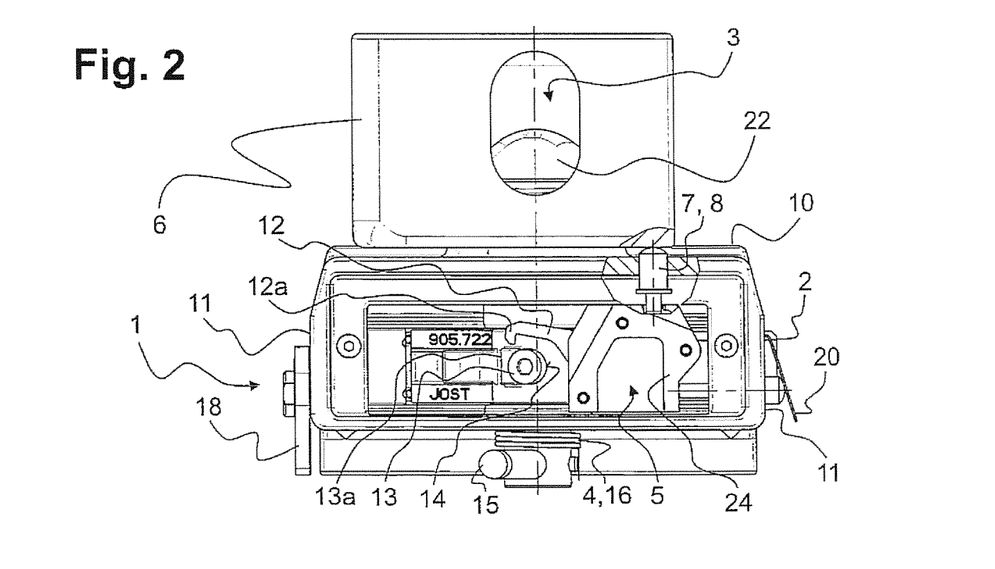
FIG. 2: a side view of the embodiment of FIG. 1 for container loading from above and vertical sensing bolt pushed into the housing.
Figure 3:
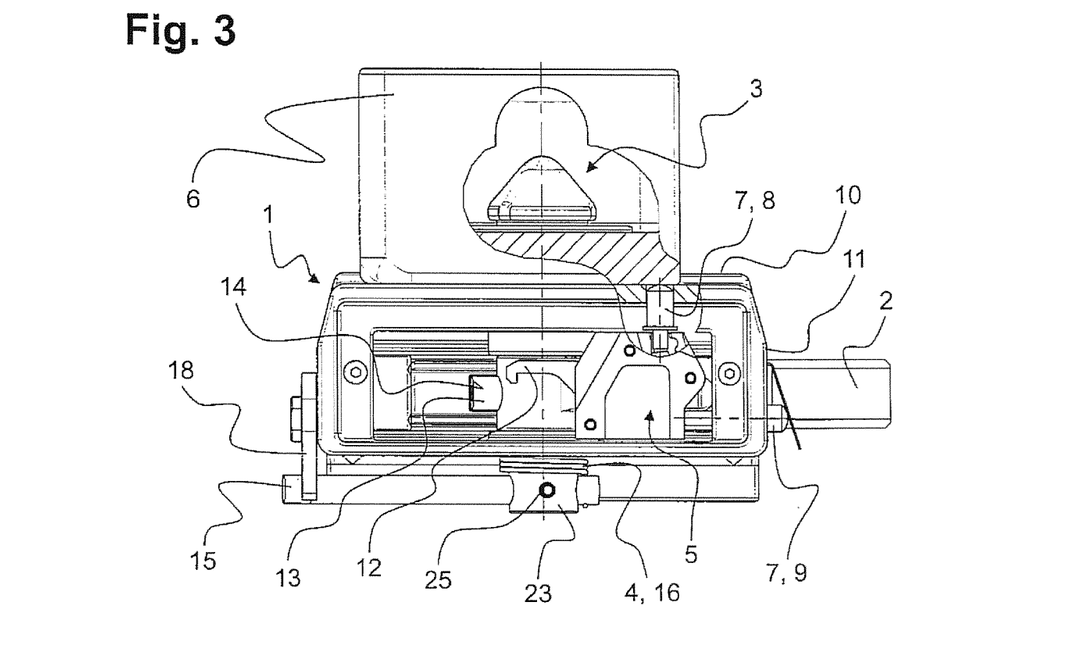
FIG. 3: a side view of the embodiment of FIG. 1 for container loading from above in locked position of rotary and plug-in pin.

FIGS. 1 to 3 show in side view a locking device for containers with a container fitting 6 approaching successively from above.

The locking device for containers comprises a boxlike housing 1 with a top wall 10 and two end walls 11 arranged at its sides. By means of other side walls and a bottom wall, not shown, the housing 1 is closed up.

The housing 1 is traversed entirely by a rotary pin 3, whose upper end 21 passes through the top wall 10 and passes into a mushroom-shaped locking head 22. The locking head 22 when a container is set down protrudes from a bottom side 6a into the container fitting 6 and after a swiveling motion of around 90° secures the container, especially against being lifted off. The lower end 23 of the rotary pin 3 protrudes downward from the housing 1.

Figure 4:
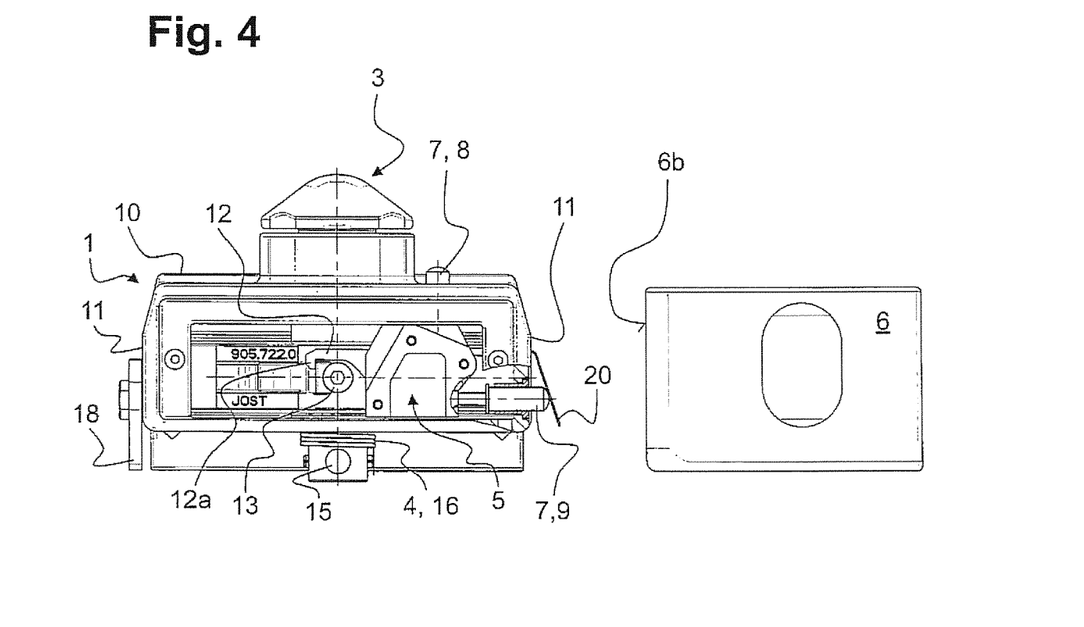
FIG. 4: a side view of the embodiment of FIG. 1 for front loading of the container in open position of rotary and plug-in pin.

In the embodiment shown, besides the described rotary pin 3 there is also present another locking means in the form of a plug-in pin 2, in order to also handle containers with a gooseneck tunnel if necessary. These containers are not set down from above onto the locking device for containers by their container fitting 6, but instead pushed forward from the side, the corresponding container fitting 6 having an opening to receive the plug-in bolt 2. The loading process and the components of the locking device for containers which are involved will be explained more closely in FIGS. 4 to 6.

Figure 10:
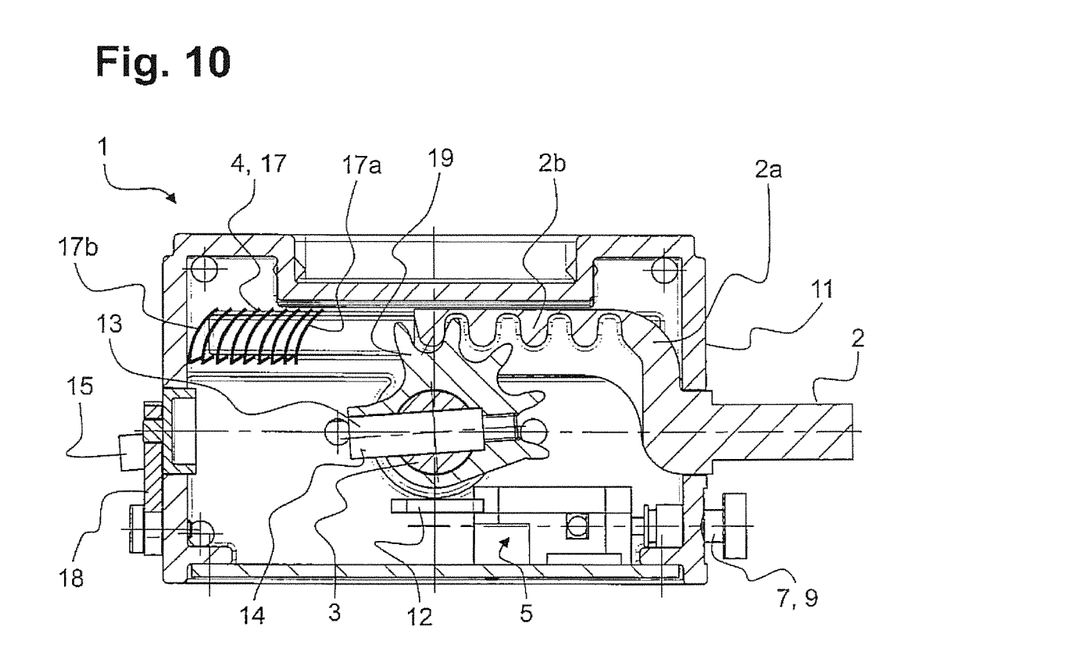
FIG. 10: a horizontal section through a fourth embodiment of the invention with spring element engaging the plug-in pin

As is seen especially in FIG. 10, the rotary pin 3 comprises a gear segment 19 projecting in the radial direction, which stands in permanent engagement with a rack segment 2b formed on the plug-in pin 2. In this way, the rotary pin 3 and the plug-in pin 2 form a gearing and are forcibly coupled together.

Due to the forcible coupling of rotary pin 3 and plug-in pin 2, it is enough in the first embodiment per FIGS. 1 to 7 to connect one spring element 4 to the rotary pin 3 or the plug-in pin 2. Insofar as the spring element 4 interacts with the rotary pin 3, it can be designed as a torsion spring 16, applying its restoring force to the rotary pin 3. The first end 16a of the torsion spring 16 is fixed stationary to or directly on the housing 1 and the opposite, second end 16b is fixed to the rotary pin 3 (see FIG. 7). The torsion spring 16 develops its restoring force especially effectively when it is shoved coaxially onto the lower end 23 of the rotary pin 3.

Inside the housing 1 is arranged a triggering element 5, comprising at least one sensing bolt 7 and one catching hook 12. Since the at least one sensing bolt 7 is supposed to sense both a vertical and a horizontal approaching of the container fitting 6, a vertical sensing bolt 8 and a horizontal sensing bolt 9 are provided. The vertical sensing bolt 8 and the horizontal sensing bolt 9 are each placed displaceably inside the housing 1 and protrude through corresponding bores from the housing 1. The vertical sensing bolt 8 emerges from the top wall 10 and the horizontal sensing bolt 9 from the adjoining end wall 11. Thanks to the protrusion of the vertical sensing bolt 8 relative to the top wall 10, the bottom side 6a of the container fitting 6 when the container is set down at first strikes against the vertical sensing bolt 8 and pushes this into the housing 1 until it is flush with the top wall 10 of the housing 1.

Thanks to the protrusion of the horizontal sensing bolt 9 relative to the end wall 11, a side surface 6b of the container fitting 6 when the container is loaded from the side at first strikes against the horizontal sensing bolt 9 and pushes this into the housing 1 until it is flush with the end wall 11 of the housing 1.

A major aspect of the invention also concerns the orientation of the vertical sensing bolt 8 to the horizontal sensing bolt 9, whose axial movement axes x, z converge on each other and furthermore lie in a perpendicular plane. The vertical sensing bolt 8 and the horizontal sensing bolt 9 can therefore both push against the catching hook 12 after a corresponding pushing by a container fitting 6 inside the housing 1.

The catching hook 12 is mounted inside the housing 1 in rocker arm 24 able to turn about a horizontal axis and swivels upward upon experiencing a pushing force from the vertical sensing bolt 8 or from the horizontal sensing bolt 9.

In FIG. 1, the container fitting 6 is still at a distance from the vertical sensing bolt 8 and the rotary pin 3 is in an open position, in which the torsion spring 16 exerts a rotary restoring force on the rotary pin 3. The rotary pin 3 is configured with a radially projecting catching element 13 inside the housing 1. The catching element 13 engages with the catching hook 12 of the triggering element 5 and prevents a rotational movement in the direction of the spring force of the torsion spring 16. For this, the catching hook 13 is provided at one end with a curved or angular region 12*a*, which engages beyond the catching element 13. At the side away from the triggering element 5, the catching element 13 has a vertical wall section 13*a* against which the angular region 12 abuts.

In FIG. 2 the container fitting 6 has pushed the vertical sensing bolt 8 into the housing 1 approximately flush with the top wall 10, the container fitting 6 still being around 6 mm away from the top wall 10. The catching hook 12 already swivels up here and triggers the locking process for the catching element 13. In the embodiment shown, the vertical sensing bolt 8 tilts the catching hook 12 about a horizontal swivel axis, so that its angular region 12*a* is released from the vertical wall section 13*a* and the rotary pin 3 rotates thanks to the spring force of the torsion spring 16 into the locked position as represented in FIG. 3. Since the plug-in pin 2 is kinematically coupled to the rotary pin 3, the plug-in pin 2 is also in the locked position, even through no suitable container fitting 6 is present in the active region.

In the locked position of the rotary pin 3 with a container fully set down per FIG. 3, the catching hook 13 has already toggled back into the original position, so that it is possible to open the locking with the container set down and the sensing bolt 7 activated. The catching hook 13 is lifted only a little during the locking process and then falls back into the original position to make possible a later opening of the locking device. At the lower end 23 of the rotary pin 3 there is seen a firmly attached activating lever 15, which swivels together with the rotary pin 3 by around 90° relative to the position in FIG. 1 and is now to be seen in its full length. In order to prevent an inadvertent releasing of the locked position during transport, a catch 18 is arranged on the end wall 11 closest to the end of the activating lever 15, which is forced upward by the activating lever 15 upon swiveling into the locked position and again drops down by gravity into a fixed position. For the swiveling of the activating lever 15 back to the opening position of the rotary pin 3, the catch 18 must be manually lifted and the activating lever 15 swiveled through under the catch 18.

In the embodiment shown, the activating lever 15 is shoved into a complementary bore inside the lower end 23 of the rotary pin 3 and secured against slipping out by a grub screw 25. With the help of the activating lever 15 the rotary pin 3 can be swiveled back into the open position before an unloading of the container. In order for the catching hook 12 to be forced upward by the catching element 13 during this swiveling process and then the catching element 13 to swivel through under the catching hook 12 and the catching hook 12 to lie against the catching element 13 from above, the latter has an inclined or rounded striking surface 14 for the lifting of the catching hook 12.

FIGS. 4 to 7 illustrate the approaching of a container fitting 6 belonging to a gooseneck container in the horizontal direction. The horizontal sensing bolt 9 is covered by a baffle plate 20 to enlarge the striking surface. The baffle plate 20 is secured rotatably to the end wall 11 of the housing 1 and lies loosely against the horizontal sensing bolt 9.

Figure 5:
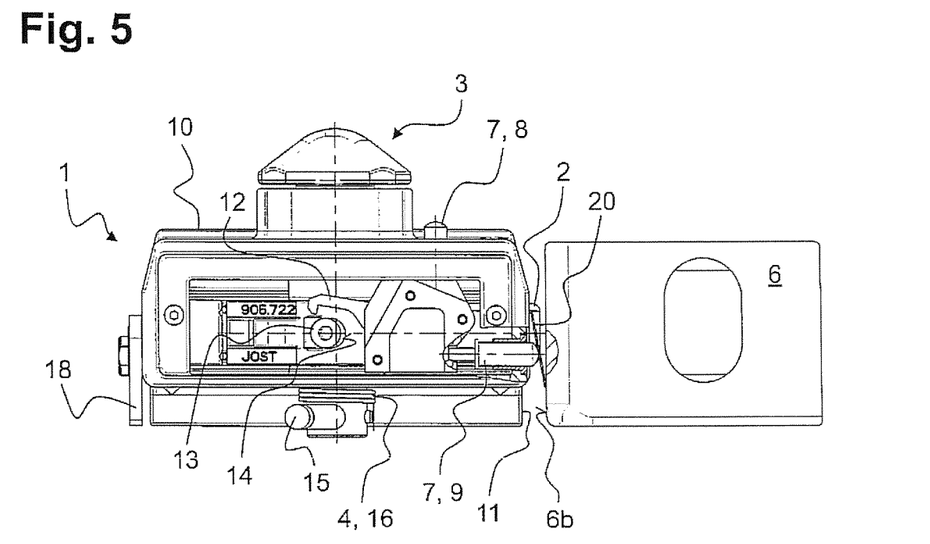
FIG. 5: a side view of the embodiment of FIG. 1 for front loading of the container and horizontal sensing bolt pushed into the housing.
Figure 6:
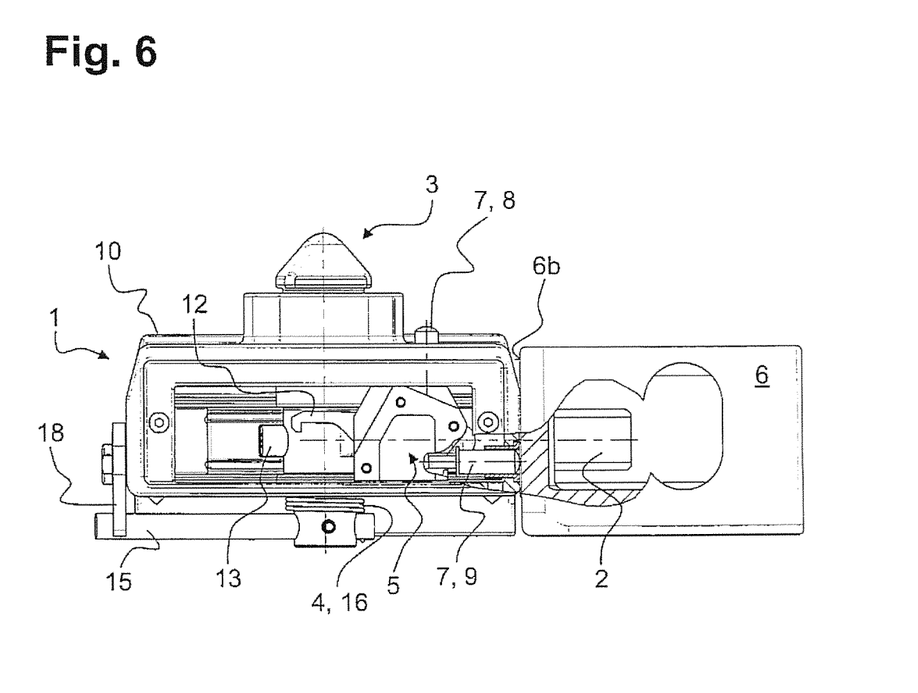
FIG. 6: a side view of the embodiment of FIG. 1 for front loading of the container in locked position of rotary and plug-in pin.
Figure 7:
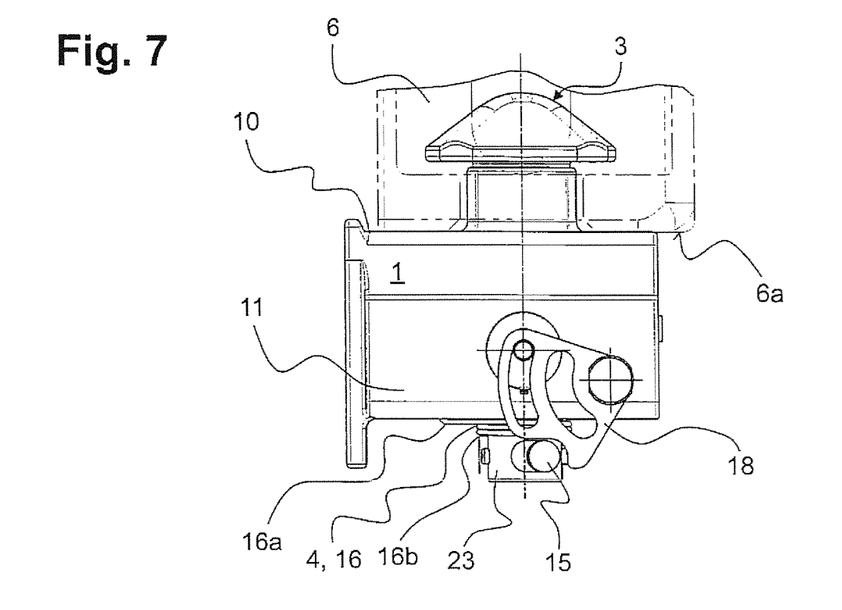
FIG. 7: a front view of the embodiment of FIG. 1 for container loading from above in locked position of rotary and plug-in pin.

Upon further horizontal approaching of the container fitting 6 per FIG. 5, at first this pushes against the baffle plate 20, which shoves the horizontal sensing bolt 9 into the housing 1 and lifts the catching hook 12 out of contact with the catching element 13. In this way, the rotary pin, spring-loaded by the torsion spring 16 but not engaging with a container fitting 6, rotates into its locked position and also moves the rack section 2*b* of the plug-in pins 2 by means of its gear segment 19 (see FIG. 10).

Figure 8:
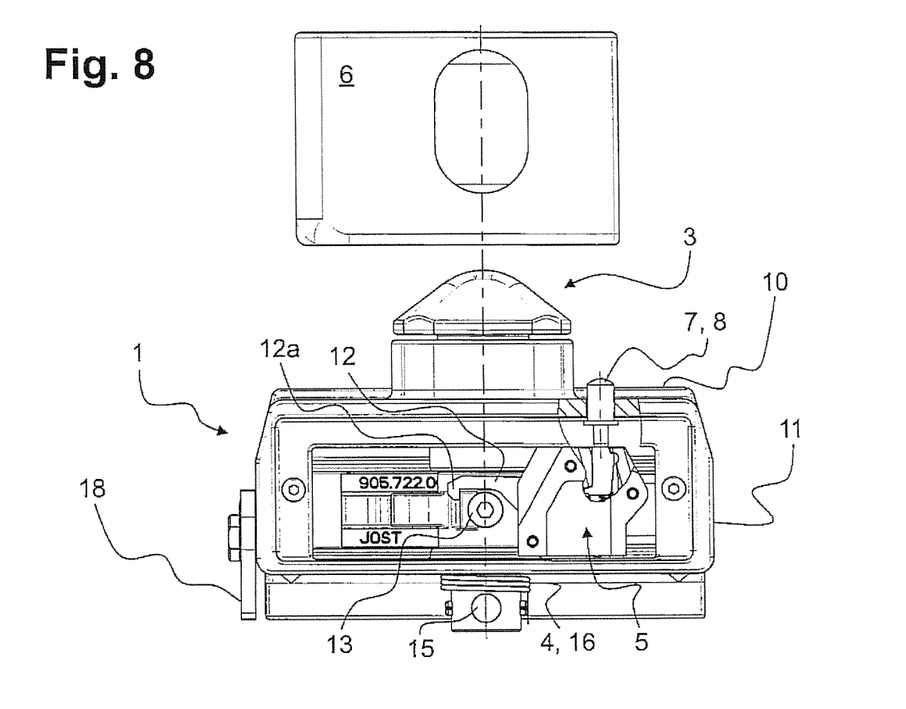
FIG. 8: a side view of a second embodiment of the invention for exclusive container loading from above in the open position of rotary pin.

FIG. 8 shows a second embodiment of the invention, in which a single sensing bolt 7 is provided in the form of a vertical sensing bolt 8, cooperating solely with the rotary pin 3. This embodiment is suitable only for vehicles which only transport standard containers without gooseneck tunnel. No horizontally displaceable plug-in pin 2 or corresponding horizontal sensing bolt 9 are required for this.

Figure 9:
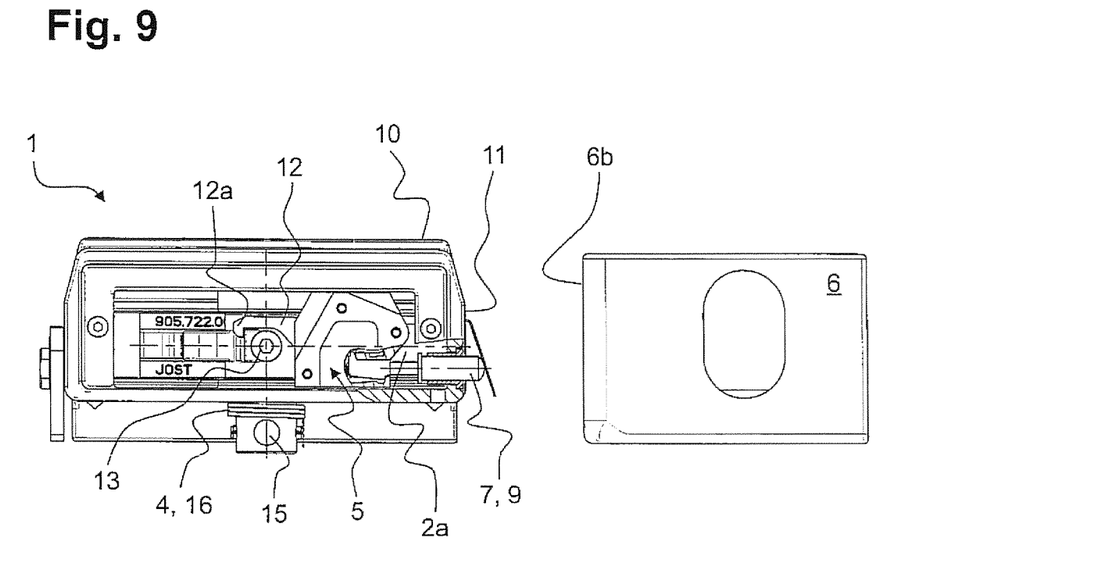
FIG. 9: a side view of a third embodiment of the invention for exclusive front loading of the container in the open position of the plug-in pin.

FIG. 9 shows a third embodiment, which is provided exclusively for the locking of containers with gooseneck tunnel and comprises a single sensing bolt 7 for this in the form of a horizontal sensing bolt 9, cooperating only with the plug-in pin 3. No vertically swivelable rotary pin 3 or corresponding vertical sensing bolt 8 are required for this application.

FIG. 10 shows a fourth embodiment of the invention, in which a compression spring 17 is used as the spring element 4 in place of a torsion spring 16. The compression spring 17 produces a pretensioning solely by a translatory movement and is therefore not connected to the rotary pin 3, but instead to the plug-in pin 2. Preferably, the compression spring 17 is shoved coaxially onto a plug-in pin section 2*a* arranged exclusively in the housing 1 and bears with its first end 17*a* against the plug-in pin 2 and with its second opposite end 17*b* against the housing 1, especially against its end wall 11. The compression spring 17 here is always fully surrounded by the housing 1.

Figure 11:
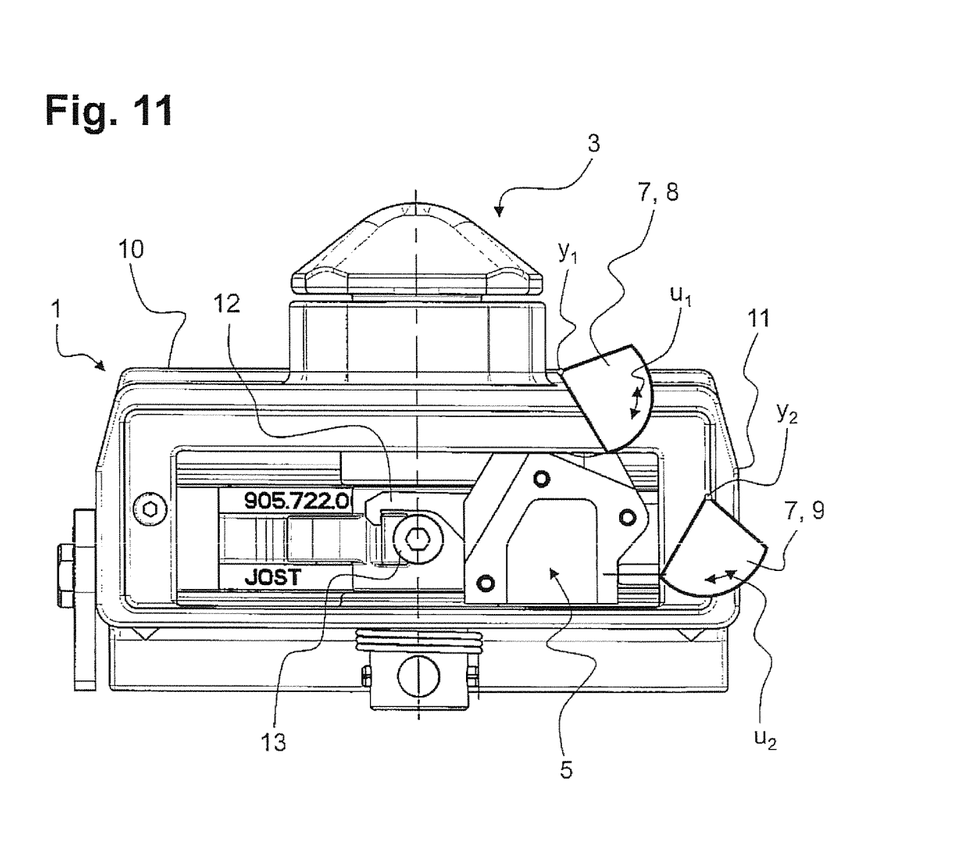
FIG. 11: a side view of a fifth embodiment of the invention with swivel mounted vertical and horizontal sensing bolt.

FIG. 11 shows a fifth embodiment of the invention, where instead of a vertical sensing bolt 8 and horizontal sensing bolt 9 mounted in longitudinal displacement relative to the housing 1 there are provided a vertical sensing bolt 8 and horizontal sensing bolt 9 which are rotatably mounted.

The vertical sensing bolt 8 is hinged by means of a first swivel axis $y_1$ to the top wall 10 of the housing 1, in the open position of the rotary pin 3 it projects beyond the top wall 10, and when placed under load by a container fitting 6 it swivels into the housing 1. In this process, the vertical sensing bolt 8 performs a swivel movement u1 about the swivel axis $y_1$. Thanks to the swivel movement $u_1$ into the housing 1, the vertical sensing bolt 8 releases the catching hook 12 from an engaged position with the catching element 13 and the rotary pin 3 pretensioned by means of the spring element 4 swivels out from the illustrated open position into the closed position. The swivel axis $y_1$ lies in a plane with the top wall 10.

In the same way, the locking device during a sideways approaching of a container fitting 6 releases at the horizontal sensing bolt 9, this being mounted able to rotate about a second swivel axis $y_2$ relative to the end wall 11. The second swivel axis $y_2$ enables a swivel movement $u_2$ of the horizontal sensing bolt 9 into the housing 1, whereby the catching hook 12 releases the rotary pin 3. The swivel axis $y_2$ lies in a plane with the end wall 11 facing the container fitting 6.

LIST OF REFERENCE NUMBERS

1 Housing
2 Plug-in pin
2a Plug-in pin section in housing
2b Rack section of plug-in pin
3 Rotary pin
4 Spring element
5 Triggering element
6 Container fitting
6a Bottom side of container fitting
6b Side surface of container fitting
7 Sensing bolt Triggering element
8 Vertical sensing bolt
9 Horizontal sensing bolt
10 Top wall of housing
11 End wall of housing
12 Catching hook of triggering element
12a Curved region of catching hook
13 Catching element
13a Vertical section of catching element
14 Striking surface of catching element
15 Activating lever
16 Torsion spring
16a First end of torsion spring
16b Second end of torsion spring
17 Compression spring
17a First end of compression spring
17b Second end of compression spring
18 Catch of activating lever
19 Gear segment
20 Baffle plate
21 Upper end of rotary pin
22 Locking head of rotary pin
23 Lower end of rotary pin
24 Rocker
25 Grub screw or clamping sleeve
$u_1$ Swivel movement of vertical sensing bolt
$u_2$ Swivel movement of horizontal sensing bolt
x Movement axis of horizontal sensing bolt
$y_1$ First swivel axis of vertical sensing bolt
$y_2$ Second swivel axis of horizontal sensing bolt
z Movement axis of vertical sensing bolt

What is claimed is:

1. A locking device for a container on a vehicle chassis, comprising:
   a housing comprising a top wall and two end walls connected to the top wall,
   a plug-in pin which is mounted displaceably in the housing and/or a rotary pin which is mounted rotatably in the housing, wherein the plug-in pin and/or the rotary pin can be moved between an open position and a locked position, and
   a spring element which interacts with a triggering element, wherein the spring element directly engages the plug-in pin or the rotary pin, wherein the triggering element has at least one sensing bolt which protrudes out of the housing in the open position and is adapted to face and engage a container fitting.

2. The locking device according to claim 1, wherein the at least one sensing bolt is a vertical sensing bolt, which is arranged axially parallel or with a slanting with respect to the rotary pin, so that a jam-free pushing is possible.

3. The locking device according to claim 1, wherein the at least one sensing bolt is a vertical sensing bolt, which is able to rotate about a first swivel axis ($y_1$).

4. The locking device according to claim 2, wherein vertical sensing bolt and the rotary pin extend through the top wall of the housing.

5. The locking device according to claim 1, wherein the at least one sensing bolt is a horizontal sensing bolt, which is mounted axially parallel or at a slant to the plug-in pin, enabling a jam-free pushing.

6. The locking device according to claim 1, wherein the at least one sensing bolt is a horizontal sensing bolt, which is mounted rotatably about a second swivel axis ($y_2$).

7. The locking device according to claim 6, wherein the second swivel axis ($y_2$) is oriented at right angles to an axial extension of the plug-in pin.

8. The locking device according to claim 5, wherein the horizontal sensing bolt and the plug-in pin extend through a common one of the end walls of the housing.

9. The locking device according to claim 5, wherein the triggering element comprises a catching hook, against which the horizontal sensing bolt pushes with a side opposite from a side that protrudes out of the housing.

10. The locking device according to claim 9, wherein the plug-in pin is held in the open position against the pretensioning of the spring element by the catching hook.

11. The locking device according to claim 9, wherein a catching element is formed on the plug-in pin, which engages behind the catching hook in the open position.

12. The locking device according to claim 11, wherein the catching element is fashioned with a rounded or inclined striking surface on a side facing the catching hook, against which the catching hook pushes during a return swiveling of the plug-in pin from the locked position to the open position and slides along the catching element until reaching the open position.

13. The locking device according to claim 11, wherein upon pushing of the horizontal sensing bolt into the housing the catching hook is released from an operative engagement with the catching element and the spring element moves the plug-in pin into the locked position.

14. The locking device according to claim 1, wherein the rotary pin is engaged, free of twisting, by an activating lever, with which the rotary pin can be brought out of the locked position into the open position and thus the spring element can be placed in a pretensioned position.

15. The locking device according to 1, wherein the spring element is a torsion spring, which is held at a first end fixed to the housing and at a second end connected to the rotary pin.

16. The locking device according to claim 15, wherein the torsion spring is arranged coaxially to a section of the rotary pin.

17. The locking device according to claim 1, wherein the spring element is a compression spring, which engages by a first end with the plug-in pin and is braced by a second end immovably against the housing.

18. The locking device according to claim 2, wherein the at least one sensing bolt is a vertical sensing bolt, which is able to rotate about a first swivel axis ($y_1$).

19. The locking device according to claim 18 wherein the vertical sensing bolt and the rotary pin extend through the top wall of the housing.

20. The locking device according to claim 19, wherein the at least one sensing bolt is a horizontal sensing bolt, which is mounted axially parallel or at a slant to the plug-in pin, enabling a jam-free pushing, wherein the at least one sensing bolt is a horizontal sensing bolt, which is mounted rotatably about a second swivel axis ($y_2$), and wherein the second swivel axis ($y_2$) is oriented at right angles to an axial extension of the plug-in pin.

21. The locking device according to claim 2, wherein the triggering element comprises a catching hook, against which the vertical sensing bolt pushes with a side opposite from a side that protrudes out of the housing.

22. The locking device according to claim 21, wherein the rotary pin is held in the open position against the pretensioning of the spring element by the catching hook.

23. The locking device according to claim 21, wherein a catching element is formed on the rotary pin, which engages behind the catching hook in the open position.

24. The locking device according to claim 23, wherein the catching element is fashioned with a rounded or inclined striking surface on a side facing the catching hook, against which the catching hook pushes during a return swiveling of the rotary pin from the locked position to the open position and slides along the catching element until reaching the open position.

25. The locking device according to claim 23, wherein upon pushing of the vertical sensing bolt into the housing the catching hook is released from an operative engagement with the catching element and the spring element moves the rotary pin into the locked position.

* * * * *